Patented Oct. 26, 1948

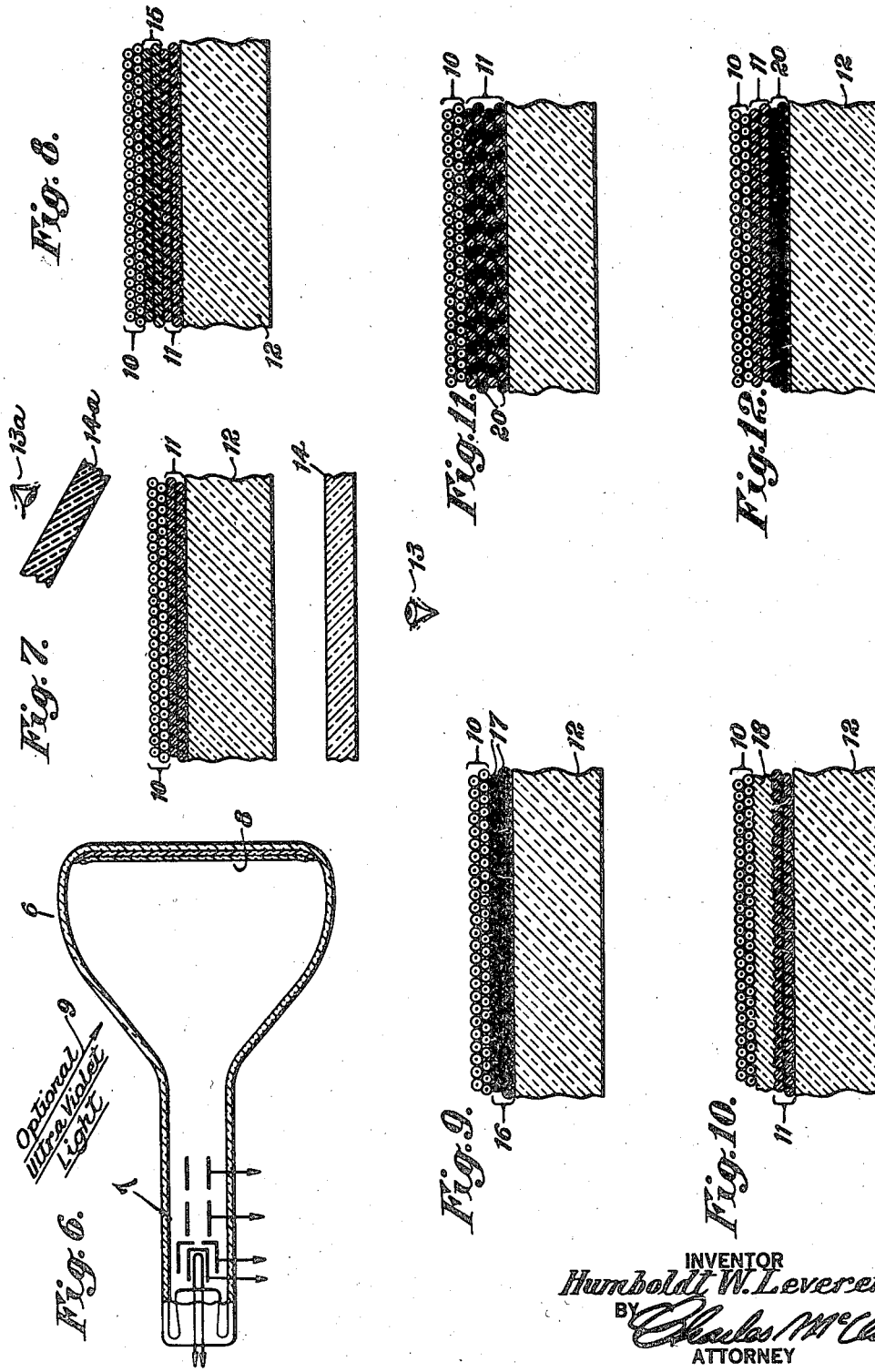

2,452,522

UNITED STATES PATENT OFFICE 2,452,522

LUMINESCENT SCREEN AND METHOD OF DEVELOPING LIGHT

Humboldt W. Leverenz, South Orange, N. J., assignor to Radio Corporation of America, a corporation of Delaware Application March 18, 1941, Serial No. 383,893

22 Claims. (Cl. 250—164)

My invention relates to luminescent materials or phosphors and phosphor combinations capable of providing unusual phosphorescent decay characteristics and to a method of developing light of long wavelength from light of shorter wavelength.

Until the nineteenth century and the advent of invisible forms of exciting energy such as ultra violet radiation, cathode ray energy and radio active emanation, phosphorescence was the principal demonstrable feature of luminescent materials. Quantitative measurements of phosphorescence have been made on thousands of materials and modern investigators have increased the exactness of phosphorescence measurements but have not discovered any phosphor having the property of exhibiting a decay curve contrary to the normal initially rapid decrease in light upon cessation of excitation, followed by a tapering off of the phosphorescent decay rate. Thus it appears that older phosphors differ chiefly in efficiency, not in any essentials of behavior, from materials recently developed for use in television and fluorescent lighting applications. Thus known phosphor materials exhibit phosphorescent decay characteristics which are either exponential or hyperbolic in form. The former type of decay is characteristic of a monomolecular process, examples of materials having such decay characteristics being the silicates and possibly tungstates. The latter type of decay of hyperbolic form is characteristic of a bi- or poly-molecular process, this type of phosphorescent decay being typical of sulfide phosphors. No simple mathematical expression will fit any one phosphorescent decay curve over its entire length. The rate of initial decay of sulfide phosphors increases rapidly with the degree of excitation, while phosphorescences of silicate phosphors are affected to a lesser degree by the degree of excitation. Thus the longer persistence "tail" of silicate phosphors is more concave upward than the first nearly exponential part of the decay curve, while phosphor decay curves with or without the tail are invariably concave upward. It has been considered by those skilled in the art that no combination of phosphors could yield a phosphorescent decay characteristic deviating from that obtained by super-position of their individual persistences, and hence it was believed that the decay characteristic of the combination would follow the same trend of upward concavity.

In accordance with my invention, I provide means for minimizing the rapid initial decrease of luminosity with time after cessation of excitation of a phosphor combination. Further in accordance with my invention, I provide means for accomplishing this desired result by means of a cascade arrangement of phosphors whereby one phosphor initially excited by a suitable means such as corpuscular radiation including cathode rays and ion bombardment, or by radiant energy such as X-rays or ultra violet radiations is made to excite another phosphor which may in turn excite a third phosphor, this method of operation continuing for any desired number of steps. In accordance with a further teaching of my invention I provide a method of developing light of relatively long wavelength by first developing luminescence of short wavelength preferably over a limited excitation time and developing light of longer wavelength from the short wavelength luminescence.

It is an object of my invention to provide a luminescent phosphor screen having a concave downward persistence characteristic during at least part of its phosphorescent decay period. Another object is to provide phosphor combinations having a phosphorescent concave downward characteristic when excited by corpuscular radiation. Another object is to provide a luminescent screen having a higher ratio of phosphorescent light intensity to fluorescent light intensity. Still another object is to provide a combination of luminescent phosphor materials and excitation means as well as methods whereby unusual phosphor decay characteristics may be obtained. A further object is to provide phosphor combinations, the individual components of which are successively excited by corpuscular and radiant energy. A further object is to provide concave downward phosphor decay characteristics with excitation effective over short periods of time. A still further object is to provide multi-layer phosphors having individual selective light absorption characteristics whereby non-exponential and nonpoly-molecular phosphorescent decay characteristics may be obtained, and it is a still further object to provide luminescent material combinations with selective radiant energy absorbing media to obtain phosphorescent decay characteristics which are at least concave downward over a portion thereof.

These and other objects, features and advantages of my invention will become apparent when taken in connection with the following description and accompanying drawing in which:

Figure 6 shows a tube incorporating one of my cascade phosphor screens, and

Figures 7, 8, 9, 10, 11 and 12 are cross-sectional views of luminescent screens made in accordance with my invention.

Figure 1:
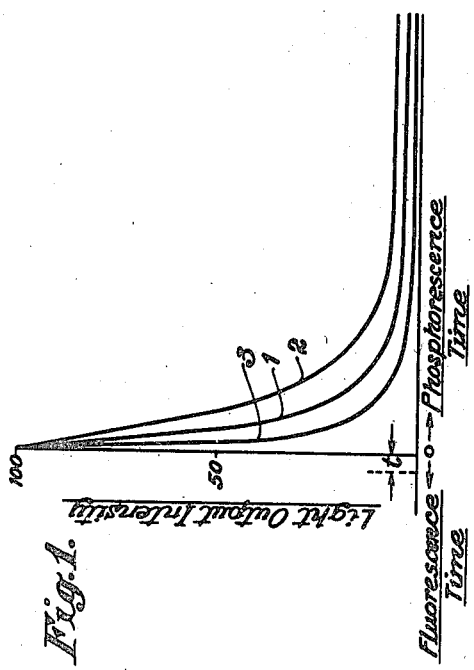
Figure 1 shows representative phosphorescent decay curves for three sulphide-type phosphors.

Referring to Figure 1 which shows three typical phosphorescent decay curves plotted against time as abscissae and percentage of initial light output intensity or ordinates, the curve 1 is representative of a zinc sulphide-cadmium sulphide copper activated phosphor as a mixed crystal, while curve 2 is representative of copper activated zinc sulphide, and curve 3 of silver activated zinc sulphide crystallized at a temperature of 1200° C. It will be noted that each of the curves shown in Figure 1 is concave upward, this characteristic being representative of all previously known phosphors and phosphor combinations. As the time "$t$" of excitation prior to cessation of excitation approaches zero, the curves 1, 2 and 3 will still retain the shape and form shown. This is likewise true for any value of "$t$" representative of the time of excitation. This is a well-known property and is true of all known phosphors and previously known phosphor combinations, as pointed out in my article entitled "Cathodoluminescence as applied to television," RCA Review, vol. V, No. 2, October, 1940, pages 166–169.

Figure 2:
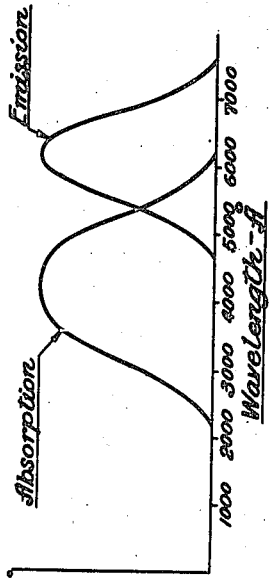
Figures 2, 3 and 4 show graphically typical light emitting and light absorbing spectral characteristics of three phosphor materials respectively.
Figure 3:
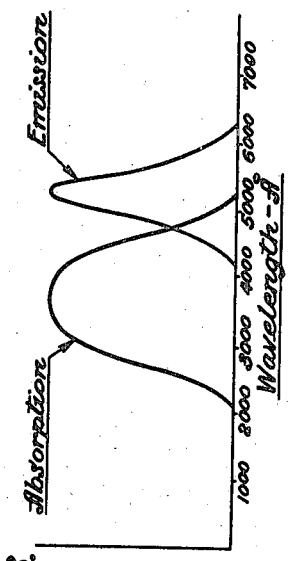
Figure 4:
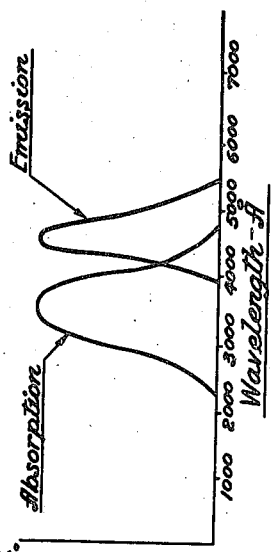

Referring to Figure 2, I have shown the spectral light emission and spectral light absorption characteristics of a zinc cadmium sulphide, copper activated, represented by the general formula $xZnS:yCdS:Cu$ as an example of a visible light absorbing phosphor. This material is distinguished from a mechanical mixture of zinc and cadmium sulphide in that it is crystallized as a single crystal, the coefficients $x$ and $y$ representing the respective amounts of zinc and cadmium which may be varied over wide limits. As the ratio of $x$ to $y$ is decreased, the spectral emission of the mixed crystal shifts toward the red portion of the spectrum. The values of $x$ and $y$ for material represented in Figure 2 are 0.7 and 0.3, respectively. In Figure 3 I have shown the light absorbing and light emission spectral characteristics of zinc sulphide, copper activated, while in Figure 4 these characteristics are shown as applied to silver activated zinc sulphide. Referring again to Figure 2, it will be noted that copper activated zinc-cadmium sulphide has a light emission peaked at roughly 6100 Å, while the copper activated zinc sulphide peaks at 5250 Å, and the silver activated zinc sulphide at approximately 4400 Å. It will likewise be noted from Figures 2 and 4 that the zinc cadmium sulphide absorbs light having a wavelength below 6000 Å. Similarly, the absorption of zinc sulphide, copper activated, and zinc sulphide, silver activated, becomes effective at approximately 4700 and 5200 Å, respectively. These relative spectral absorption and emission curves show that zinc cadmium sulphide will absorb the light liberated by copper activated zinc sulphide and silver activated zinc sulphide and that copper activated zinc sulphide will absorb the light emission of silver activated zinc sulphide. By the term "absorption" I mean that the light is efficiently absorbed in the sense that the principal portion of the absorbed radiation is converted into luminescence.

The energy representative of light absorbed is, in accordance with my invention, utilized to liberate light from the absorbing phosphor, thereby completely changing the decay characteristic of the combination. Thus, in accordance with my invention, I provide a luminescent screen having a concave downward persistence characteristic during at least part of its phosphorescent decay period by utilizing a cascade arrangement of phosphor layers whereby one phosphor initially excited such as by cathode rays is made to excite another phosphor contiguous with the first phosphor. More particularly, I provide a phosphor layer capable of liberating light of short wavelength, which light is utilized in another layer absorptive to the light of short wavelength to liberate light of a longer wavelength. Thus I have found that if two or more layers of phosphors having spatially related spectral emission and absorption characteristics are combined, the resulting phosphorescent decay period is not only lengthened but is completely changed from an exponential or hyberbolic form to a form which is concave downward over the major useful portion of the light output characteristic. By the phrase "spatially related spectral emission and absorption characteristics" I mean characteristics wherein the emission and absorption curves are shifted toward the red portion of the spectrum in the direction of the propagation of the primary exciting energy and the absorption region of one layer falls within the emission spectrum of an adjacent phosphor layer.

Figure 5:
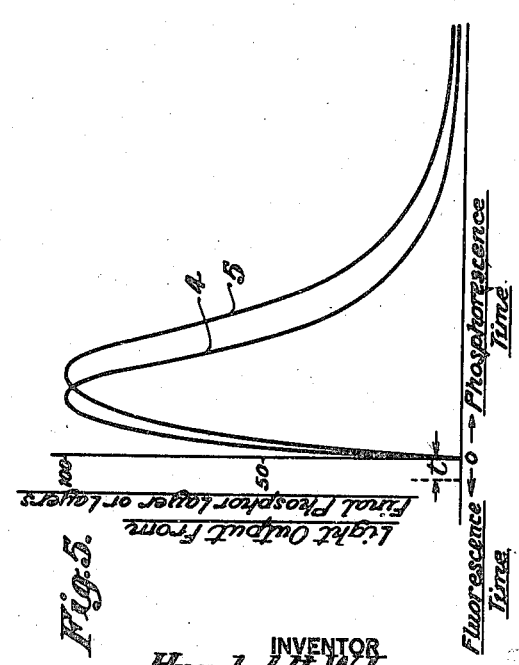
Figure 5 shows two phosphor decay curves of cascade phosphor screens made in accordance with my invention.

Referring to Figure 5, I have shown two curves 4 and 5 representative of the decay characteristic of two of my phosphor combinations. Referring to Figure 5, the time "$t$" of excitation just prior to cessation of excitation may approach zero, and as this value approaches zero, the curves 4 and 5 will be obtained for two types of luminescent screen assembly. For relatively long excitation times, the phosphorescence characteristic may approach the type of curves shown in Figure 1. For intermediate excitation times, the phosphorescence characteristic may be intermediate in shape to the type of curves represented by Figure 1 and Figure 5. The curve 4 is representative of a two-layer cascade screen wherein the first or primary layer, activated by the primary energy, principally comprises silver activated zinc sulphide, whereas the other layer, activated by the primary layer of zinc sulphide, principally comprises copper activated zinc cadmium sulphide. Similarly, the cascade arrangement of phosphors of which curve 5, Figure 5, is representative comprises the layers of curve 4 with an intermediate phosphor layer of copper activated zinc sulphide.

Since phosphors have a definite excitation or build-up time usually proportional to their phosphorescent decay characteristics, a considerable delay can be occasioned between the initial excitation and the eventual emission of the bulk of the useful light from the final phosphor in the cascade. Thus with a blue emitting ZnS:Ag long prseistence phosphor layer and a blue absorbing and green-yellow-orange or red emitting ZnS:CdS:Cu long persistence phosphor, the latter phosphor produces the preponderance of useful light. The light output properties of my cascade screen following cessation of primary excitation may be compared with the characteristic curves depicting the formation and decay of certain radio-active transformation products. Thus the excitation of one layer in turn excites the second layer which in turn may excite a third layer. Each of the excitations subsequent to the primary excitation of the primary layer is delayed due to the finite time required by the physical process of luminescence excitation and emission.

In Figure 6 I have shown a tube 6 of the cathode ray type including an electron source such as the electron gun 7 to develop a beam or flood of electrons incident upon the luminescent screen 8. The electron gun 7 may be of the conventional type incorporating one or more anodes to focus the electron beam which may be scanned over the screen or it may be designed to subject the screen 8 to a flood of electrons. Conventional beam modulation preferably of the intensity or grid modulation type may be utilized. The electron source may be replaced by or supplemented by a radiant energy source 9 such as a source of ultra violet light as hereinafter explained, in which case the glass of the tube 6 may be of ultra violet transmitting material. Various types of luminescent screens made in accordance with my invention are shown in Figures 7-12, and referring to Figure 7, the screen comprises two individual layers 10 and 11, supported on a transparent foundation 12 which may be of glass, mica, quartz or any other suitable material. This foundation may comprise the end wall of a tube, as shown in Figure 6, or may be a separate foundation within the tube.

In the following description I will use the term "primary" layer to designate the outermost layer from the foundation, such as the layer 10 excited by the primary incident energy which, as hereinafter explained, may be either of the radiant or corpuscular type. The next layer in order of progression from the primary excitation, such as the layer 11, may be termed the "secondary" layer, this layer being closer to the foundation than the primary layer. Similarly, if a multi-layer cascade arrangement having more than two layers is utilized, I will refer to the third layer as the "tertiary" layer, although I am not limited to the use of only three layers in my cascade arrangement of phosphors.

The primary layer 10 of the binary screen structure of Figure 7 is of a material such as will liberate light of relatively short wavelength, that is, high frequency, whereas the secondary layer 11 is of such a material as to utilize the shorter wavelength light liberated by the primary layer by absorption to produce light of longer wavelength, that is, lower frequency. Any of the well-known phosphor materials chosen with respect to their spectral emission and absorption characteristics may be utilized for the primary and secondary layers. The following table is indicative of the luminescent materials which may be used:

| Primary Layer | Secondary Layer |
|---|---|
| (1) Copper-activated beryllium zirconium silicate | (2) Silver-activated zinc sulphide |
| | (3) Copper-activated zinc sulphide |
| | (4) Silver-activated zinc cadmium sulphide |
| | (5) Copper-activated zinc cadmium sulphide |
| | (6) Silver- or copper-activated zinc sulpho-selenide |
| (7) Silver-activated zinc sulphide | (8) Copper-activated zinc sulphide |
| | (9) Copper-activated zinc cadmium sulphide |
| | (10) Silver-activated zinc cadmium sulphide |
| | (11) Silver- or copper-activated zinc sulpho-selenide |
| (12) Copper-activated zinc sulphide | (13) Silver-activated zinc cadmium sulphide |
| | (14) Copper-activated zinc cadmium sulphide |
| | (15) Silver- or copper-activated zinc sulpho-selenide |

It will be noted that all of the materials recited in the above tabulation as well as other phosphors referred to hereinafter are of the inorganic type, the organic phosphor materials known to the prior art being wholly unsuited for use in my cascade arrangement of phosphors because their luminescence is essentially pure fluorescence not phosphorescence. In materials (4), (5), (9) and (10) any ratio of ZnS to CdS content may be used, but in materials (13) and (14) this ratio should be less than approximately 4.0 and 9.0, respectively.

The excitation of the primary layer 10, as indicated above, may be by either of the radiant energy or corpuscular energy type and the thickness of the primary layer and the penetrating ability of the energy incident thereon are so chosen that the primary layer is the layer principally excited by the incident energy. Thus if the exciting energy is of the corpuscular type such as a beam of cathode rays, the velocity of the electrons comprising the beam is so chosen that for a given thickness of the primary layer 10 substantially all of the electron energy is absorbed, although a predetermined thickness of the secondary layer may be excited for certain reasons, such as to initiate the curves of Figure 5 at a higher point along the ordinate axis. However, if the energy exciting the primary layer is of the radiant energy type such as ultra violet light, the frequency of the ultra violet as well as the thickness of the primary layer may be chosen such that the energy is completely absorbed within the primary layer or a portion of the lawer in the direction of its thickness. The structure shown in Figure 7 is preferably viewed through the transparent foundation 12 as shown by the viewing symbol 13, and to avoid viewing light directly occasioned by primary excitation rather than light due to secondary excitation, a suitable filter 14 may be interposed between the viewer and the foundation, although such a filter need not be used in all applications of my invention. For a primary layer 10 comprising silver activated zinc sulphide and a secondary layer comprising copper activated zinc cadmium sulphide the filter 14 may have the characteristic of absorbing blue light, thereby enabling the observer to see only the light liberated by the secondary layer 11. In certain applications it may be desirable to view my cascade screen from the same side as that which is subject to the primary exciting energy, in which case the filter 14 may be arranged on the primary layer side as shown at 14a intermediate the primary layer and viewer 13a. In this case, the filter 14a may be of greater optical density in the spectral region for which filtering is desired.

It will be appreciated that I am not limited to the use of a dual-type cascade arrangement but that any number of phosphor layers may be provided wherein the phosphors of the individual layers are chosen with particular reference to their spectral emission and absorption characteristics. Referring to Figure 8 which shows a structure incorporating three phosphor layers, the primary layer 10 may be of the same material as the primary layer 10 of Figure 6, and similarly, the layer 11 which is now termed the tertiary layer may be similar to the secondary layer 11 of Figure 7. Intermediate the primary layer 10 and tertiary 11 I provide a secondary or intermediate layer 15 comprising a phosphor material having spectral emission and absorption characteristics intermediate those of the primary and tertiary layers. The phosphor decay characteristic shown in Figure 5, curve 5, is representative of the phosphorescent decay period structure of Figure 8 wherein the primary layer comprises predominantly ZnS:Ag, the secondary layer ZnS:Cu, and the tertiary layer ZnS:CdS:Cu. It will be noted that I have chosen the three materials comprising the three layers with respect to their spectral emission and absorption characteristics, such that the primary layer liberates violet and blue, the secondary layer green and yellow, and the tertiary layer yellow-orange to red. Other materials suitable for a tertiary cascade arrangement are given in the followng tabulation where the numbers designate correspondingly numbered materials in the above tabulation of materials for the binary-type screen.

| Primary Layer | Secondary Layer | Tertiary Layer |
| --- | --- | --- |
| (1) | (2) | (3) |
| (1) | (3) | (5) |
| (7) | (8) | (9) |
| (7) | (10) | (9) |
| (12) | (13) | (14) |

Any ratio of ZnS to CdS may be used for the materials (5) and (9), but materials comprising the secondary and tertiary layers in the last two examples should be chosen so that the ratio of ZnS to CdS content of the tertiary layer is equal to or less than that of the secondary layer.

The above tables of materials for cascade screens are not necessarily all inclusive, but are illustrative of various materials which are suitable for the individual layers, it being understood that these tabulations may be supplemented by other materials and material combinations similarly chosen with respect to their spectral emission and absorption characteristics.

It will be apparent that I have referred to the various layers as including only one material, but it is often desirable to provide individual layers in a cascade layer arrangement comprising more than a single material. The following materials listed in order of increasing wavelength of their peaked spectral emissions may be used as explained below:

| No. | Material | Characteristic Color |
| --- | --- | --- |
| 1 | $Be_2Zr_2Si_3O_{12}:Cu$ | Ultra violet and violet. |
| 2 | $ZnS:Ag$ | Violet and blue. |
| 3 | $ZnS:Cu$ | Green. |
| 4 | $0.9ZnS:0.1CdS:Cu$ | Green-yellow. |
| 5 | $0.7ZnS:0.3CdS:Cu$ | Hellow-orange. |
| 6 | $CdS:Cu$ | Red-infra red. |

Each of the above materials may be used as an individual layer making a six-layer cascade screen, or each of three layers may comprise a mixture of two or more materials selected in descending order. Thus a three-layer cascade screen may comprise mixtures of materials (1) and (2) for the primary layer, mixtures of materials (3) and (4) for the secondary layer, and mixtures of materials (5) and (6) for the tertiary layer.

I have referred to the fact that it is desirable to choose the corpuscular radiation with respect to its velocity, and radiant excitation with respect to its frequency so that substantially only the primary layer is excited by the incident energy. However, in accordance with a further teaching of my invention the secondary layer may be shielded from the excitation of the primary energy incident predominantly upon the sulphide. However, as shown in Figure 9, the phosphor materials of the two layers may be similar to those shown in connection with Figure 7 or to the materials chosen from the above tabulations. Thus the primary layer again designated 10 may be of silver activated zinc sulphide, and likewise the secondary layer here designated as 16 may be of copper activated zinc cadmium sulphide. However, as shown n Figure 9, the individual particles of the phosphor material comprising the secondary layer 16 may be coated with material which might be termed "opaque" with respect to the primary excitation, but "transparent" with respect to the light liberated by the primary layer, so that the phosphor material of the secondary layer absorbs and becomes excited by this light. Thus for primary excitation of the corpusucular type, such as represented by electron excitation, the individual particles of the secondary layer 16 may be provided with a coating 17 of potassium silicate which is relatively opaque to electron bombardment but transparent with respect to the light liberated by the ZnS:Ag primary layer 10. Similarly, if the excitation of the primary layer is to be of the radiant energy type, such as ultra violet light, the material of the primary layer is chosen to liberate light in the near ultra violet, that is, in the near visible region of the spectrum, such as around 4000 Å, and the material surrounding the particles of the secondary layer is made opaque to the ultra violet exciting energy but transparent to the near ultra violet, such as approximately 4000 Å. Low melting point, low silica content glasses having the desired light filtering properties may be used for this purpose.

While I have shown in Figure 9 the use of material surrounding the particles of phosphor material comprising the secondary layer, the structure of Figure 10 may be utilized wherein the material which is opaque to the incident exciting energy and transparent to the excited radiation is in the form of an individual layer 18 intermediate the primary layer 10 and secondary layer 11. The material of the intermediate layer 18 may be chosen in the same manner as the material 17 enclosing the particles of the secondary layer in Figure 9, or the materials comprising the layers 10 and 11 may be deposited on opposite sides of a sheet of material such as glass opaque to the energy exciting the layer 10. If ultra violet excitation is used, the layer 18 may be an optical filter substantially opaque to the exciting energy, but transparent to the excited energy of the layer 10. Filters suitable for this purpose are Corning Glass Company filter Nos. 375, 428 and 557, and Jena filter Nos. GG-1 and GG-2. Obviously, these principles of relative selective absorption and transmission may be applied to cascade screens of more than two layers within the scope of my invention.

In certain applications it may be desirable to simultaneously excite two or more of the cascade phosphor layers, and in accordance with this teaching of my invention I provide a combination of different forms of exciting energy. Thus a primary layer may be excited by ultra violet light as well as by electron irradiation. Similarly, the primary layer may be excited by low velocity electron bombardment which is substantially completely absorbed by the primary layer, and the secondary layer may be simultaneously or sequentially excited by high velocity electron bombardment. For example, a low velocity high current cathode ray beam may be used simultaneously or sequentially with a high velocity low current cathode ray beam to obtain a substantially flat phosphorescence characteristic which eventually decays quite rapidly. Similarly, a strong ultra violet source may be used to excite principally the primary layer while a cathode ray beam or X-rays may be used to excite both the primary and the secondary layer in a multi-layer screen.

It will be noted from the above combination of individual phosphor layers that I have chosen primary, secondary, tertiary and additional layers which liberate light of progressively longer wavelength. Thus the color of the light liberated from the secondary, tertiary or whichever is the final layer may be of relatively long wavelength, and the light from the final layer predominantly constitutes the useful light. The tail of the persistence characteristic may extend for a period of time longer than desired, and in accordance with a further teaching of my invention, I am able to terminate the period of phosphorescence relatively abruptly. Referring to Figure 11, the cascade screen may comprise, as indicated above, a primary phosphor layer 10 and a secondary phosphor layer 20 of one material selected in accordance with my above teaching mixed with another material excitable to infra red by either the primary layer or the other component of the secondary layer. If dual exciting energy such as a combination of electron and ultra violet excitation is used, the material excitable to infra red may be excited by one or the other exciting means. The second component of material of layer 20 is chosen to be infra red emitting and may comprise a phosphor, such as copper or silver activated cadmium sulphide.

These materials have the properties of liberating infra red light when excited by light of shorter wavelength. The infra red light liberated by the infra red phosphor component is effective in quenching the phosphorescence developed by the preceding layer 10. This material may have an infra red emission characteristic which is either faster or slower in building to a maximum than is the emission characteristic of the phosphor or phosphors whose light is to be transmitted or observed. Thus the phosphorescence of the second material component may reach a maximum prior or subsequent to the first material component reaching its maximum so that the light from the secondary layer may be utilized over its most effective amplitude range, followed by a very rapid decay due to the quenching action caused by the infra red emitting phosphor. The mechanics of this quenching action is not fully understood, but it may be due to an acceleration of the liberation of light from the first component of the layer or to a conversion of the light liberated to other forms of energy such as heat. The infra red emitting phosphor material comprising a component of the layer 20 may be CdS:Cu, CdS or CdS:Ag and need not necessarily be provided as a mixture with the final layer, but may be a discrete layer as shown in Figure 12.

While I have shown the use of optical filters only in connection with the cascade screen illustrated in Figure 1, it will be obvious that such filters may be used with the structures of Figures 6–12, or that the material comprising the foundation 12 or end wall of the tube of Figure 6 may be opaque to the light other than that developed by the final layer. The use of such filters may, however, be obviated by viewing the cascade screen from the secondary, tertiary or whichever is the final layer side of the assembly, such as through the transparent foundation 12, especially if the phosphor comprising the primary layer exhibits a spectral emission in the ultra violet region.

From the above description of the various embodiments of my invention it will be apparent that I have described a new method of developing useful luminescent light of relatively long wavelength including steps of first developing light of relatively short wavelength, absorbing this wavelength light and simultaneously developing the useful light of longer wavelength either directly or through a succession of steps involving the development and absorption of light having intermediate wavelengths. My method is not dependent upon the normal operation of a luminescent screen made in accordance with my invention. For example, the light of short wavelength, that is, high frequency light, may be developed by subjecting a phosphor layer to exciting energy, moving the phosphor layer into proximity with another layer having higher wavelength emission and absorption characteristics, this latter layer being maintained at a low absolute temperature to energize but not excite the second layer. The temperature of the second layer may then be raised to develop the light of longer wavelength. Similarly, the second layer may energize a third phosphor layer having spatially related spectral emission and absorption characteristics, the steps being repeated to develop light of the desired relatively long wavelength.

While I have not specifically indicated various applications to which my new cascade screens may be applied, it will be apparent that they offer great advantages in applications where it is desired to observe the effects of transient phenomena. It will likewise be appreciated that the method of my invention may be employed with shorter persistence phosphors, such as low temperature crystallized silver activated zinc sulphide and zinc cadmium sulphide to decrease flicker in conventional oscillograph tubes where it is desirable to have a beam trace of substantially the same intensity over the entire screen. In this manner many varied decay curve shapes and decay times may be produced with the above-described method when using a combination of known phosphors. Thus while I have indicated the various preferred embodiments of my invention, it will be appreciated that I am not limited to the particular apparatus and methods herein described except as set forth in the appended claims.

I claim:

1. A luminescent screen for developing useful phosphorescent light comprising a plurality of inorganic phosphor layers, one of said layers being adapted to be subjected to exciting energy, said layers being arranged in order of their decreasing frequency excitation spectra, the said one layer developing ultra violet light of a higher frequency than the light of the next adjacent layer, the layer most remote from said one layer developing the preponderant portion of useful light and absorbing substantially all of the higher frequency light incident thereon from a preceding layer.

2. A luminescent screen capable of developing useful phosphorescent light without material output of luminescent light comprising a succession of contiguous inorganic phosphor layers adapted to be progressively excited, said layers being arranged in order of progressive excitation whereby the excitation of one layer produces excitation of the next adjacent layer, the materials of each phosphor layer being such that each layer in succession absorbs substantially all of the light liberated by a preceding layer, the useful light developed by said succession of layers being substantially developed only by the last layer in order of the progressive excitation.

3. A luminescent screen capable of developing predominantly phosphorescent light comprising inorganic phosphor means to liberate light of relatively short wavelength including ultraviolet when excited by exciting energy, and inorganic phosphor means adjacent said first means absorbent to the ultra violet light and light of relatively short wavelength to convert said light to useful longer wavelength light, said useful light being developed predominantly by said second-mentioned phosphor means and the light of relatively short wave length including ultra violet being substantially completely absorbed by said second mentioned inorganic phosphor means.

4. A luminescent screen comprising a support member to transmit useful light, a coating of inorganic phosphor material on said support member, a second coating of inorganic phosphor material on said first-mentioned coating, the said materials having decreasing peak wavelengths of emission spectra in the order of application to said base member and the useful light transmitted through said support member being phosphorescent light developed predominantly by the material on said support member, said support member being substantially opaque to the emission spectrum of said second phosphor coating.

5. A luminescent screen for developing light comprising a transparent support surface, a plurality of at least three super-positioned inorganic phosphor layers, each of which exhibits relatively long phosphorescence following excitation, one of which is adjacent said surface, the phosphors comprising said layers having decreasing peak wavelengths of emission spectra in the order of their position away from said surface, said layers between said surface and the outermost layer being absorbent to substantially all of the light developed by the preceding layer, the useful light being phosphorescent light developed predominantly by the layer adjacent said surface.

6. In combination a screen for developing phosphorescent light to be viewed from one side thereof including a plurality of inorganic phosphor layers adapted to be progressively excited to luminescence, said layers being of materials having spatially related spectral emission and absorption characteristics and arranged in order of progressive excitation with their spectral emission wavelengths approaching the infra red portion of the spectrum and a filter adjacent the side of said screen from which the light is to be viewed to absorb light developed by the layer having the shortest wavelength spectral emission.

7. In combination a screen for developing phosphorescent light to be viewed from one side thereof including a plurality of contiguous inorganic phosphor layers adapted to be progressively excited to luminescence, said layers being of materials having spatially related spectral emission and absorption characteristics and arranged in order of progressive excitation with their spectral emission wavelengths approaching the infra red portion of the spectrum and a filter substantially opaque to light developed by the layer having the shortest wavelength spectral emission positioned adjacent the side of said screen to be viewed whereby the useful developed light is limited to spectral wavelengths approaching the infra red portion of the spectrum.

8. In combination a screen for developing phosphorescent light of relatively long wavelength comprising a layer of inorganic phosphor material excitable to luminescence in the blue portion of the spectrum, a second layer of inorganic phosphor material absorbent to light in the blue portion of the spectrum and excitable under blue light to light of longer wavelength, said screen being adapted to be viewed from the side of said first mentioned layer and a filter absorbent to blue light and substantially transparent to light of said longer wavelength adjacent said first mentioned layer and on the side thereof opposite said second mentioned layer whereby a portion of the light developed by the first mentioned layer is absorbed and the useful light developed by said phosphor layers is predominantly that developed by said second layer.

9. A luminescent device comprising a source of primary luminescence exciting energy, a screen foundation, a luminescent screen on said foundation including a plurality of superposed phosphor layers, each of said layers being of inorganic phosphor material having a concave upward phosphorescent decay characteristic, the said layers likewise being of different phosphor compositions having differing peak wavelength spectral emissions, the layers being arranged between said source and said foundation in increasing wavelength order of their spectral emissions, said foundation being selectively transparent to luminescence of said layers, the transparency being a maximum for the layer nearest adjacent said foundation and a minimum for the layer further removed from said foundation.

10. A luminescent device comprising a source of cathode rays, a screen foundation oppositely disposed from said source, a screen on said foundation comprising a plurality of inorganic phosphor layers having high phosphorescence following excitation by said rays, the layer nearest adjacent said source being of sufficient thickness to absorb substantially the major portion of said cathode rays and shield the next adjacent layer therefrom, the phosphors of said layers having different wavelength emission spectra, the said nearest adjacent layer having the shortest wavelength emission spectrum.

11. A luminescent screen comprising a support member, a plurality of phosphor layers on said support member, each layer including a mixture of phosphorescent light emitting inorganic phosphors, the average spectral emission and absorption peak wavelengths for the materials of each layer being different, said layers being arranged in order of their decreasing average emission and absorption wavelength spectra with increasing distance from said support member.

12. The method of developing luminescent light of relatively low frequency including the steps of developing over a short period of time luminescent light of relatively high frequency, absorbing substantially all of the energy representative of light of high frequency, converting said energy into light of relatively low frequency, and limiting said period of time to a time shorter than that required for converting the principal portion of said energy into light of relatively low frequency.

13. The method of developing useful luminescent light of relatively long wavelength comprising developing luminescent light of short wavelength, successively developing quantities of light of longer wavelengths, simultaneously absorbing light of wavelengths shorter than each successively developed quantity of light of longer wavelength, and terminating the development of said luminescent light of short wave length before the development of the principal portion of the light of longest wave length.

14. The method of developing luminescent light of relatively low frequency comprising the steps of developing luminescent light having a high frequency, successively developing quantities of light of decreasing frequency and simultaneously absorbing the successively developed decreasing frequency light quantities with the exception of the light of lowest frequency.

15. The method of developing luminescent light of relatively long wavelength which comprises exciting a phosphor having a short wavelength emission and absorption spectrum over a period of time to develop luminescence of short wavelength, utilizing said developed luminescence to develop light of longer wavelength and limiting the time of excitation to less than the time required for developing the light of longer wavelength.

16. For use in a cathode ray tube having means for producing and deflecting an electron beam, a screen comprising a first component which is exposed to the electron beam and which is adapted to generate light radiations when excited by electron impingement and a second component which is excited by such light radiations and is effectively shielded from electron impingement and which is adapted to produce visible luminescence of longer persistence than the radiations generated by either component when excited by electron impact.

17. For use in a cathode ray tube having means for producing and deflecting an electron beam, a screen comprising a first component which is exposed to the electron beam and which is adapted to generate light radiations adjacent the short wave end of the spectrum when excited by electron impingement and a second component which is effectively shielded from electron impingement and which is adapted to produce visible luminescence when excited by the light radiations from said first component, said second component comprising zinc-cadmium sulfide.

18. For use in a cathode ray tube having means for producing and deflecting an electron beam, a screen comprising two layers of individual phosphors, separated by an electron-impervious material, one of said layers being exposed to the electron beam and comprising a phosphor adapted to generate light radiations when excited by electron impingement, and the other said layer comprising a phosphor which produces a visible luminescence persisting for at least several seconds when excited by the light radiations emitted by the first mentioned layer.

19. An electron discharge device comprising an envelope providing a window, means in said envelope for generating a beam of electrons directed upon said window, a luminescent screen applied upon the interior surface of said window comprising a foundation phosphor which is applied adjacent said window and is adapted in response to short wave light excitation to produce visible luminescence of long persistence, and an exciting phosphor applied thereover which is exposed to impingement of said electron beam, said latter phosphor being adapted to generate in response to electronic excitation ultraviolet and adjacent blue radiation which is capable of exciting luminescence in said foundation phosphor, said exciting phosphor having sufficiently great thickness to effectively shield said foundation phosphor from electrons.

20. A luminescent device comprising an envelope having a window transparent to visible light and enclosing a luminescent screen and means for producing and deflecting an electron beam, said screen comprising at least two superimposed contiguous phosphor layers of unlike inorganic phosphors, one phosphor layer positioned to be exposed to the electron beam and emitting in response to impact of the electron beam short wave-length radiation in and adjacent to the short wave end of the visible spectrum, and the other phosphor layer facing said window and shielded from the electron beam and exposed only to said short wave-length radiation from said first mentioned layer and emitting in response to said short wave-length radiation from the first mentioned phosphor visible radiation of longer wave-length.

21. A cathode ray tube comprising an envelope having a window transparent to visible light and enclosing a luminescent screen and a source of electrons for generating a beam of electrons directed upon said screen, said screen comprising three contiguous layers, the two outer layers being of unlike inorganic phosphors, one layer facing said source and emitting short-wave radiation in and adjacent to the short-wave end of the visible spectrum in response to electron impact, the intermediate layer being of electron impervious material transparent to the short-wave radiation of said first mentioned phosphor layer, the other phosphor layer facing said window and excited by the short-wave radiation from the first named phosphor to produce visible light of longer wavelength.

22. A luminescent screen capable of developing useful phosphor light without material output of fluorescent light comprising a plurality of adjacent inorganic phosphor layers adapted to be progressively excited to luminescence, the inorganic phosphor of each layer having different spectral emission characteristics, said layers being arranged in order of their increasing wave length of their respective emission and absorption spectra and in order of their progressive excitation, the phosphor layer having the shortest wave length emission spectra being of a material luminescent under incident energy and of sufficient thickness to absorb substantially all of the incident energy, the layer having the longest emission and absorption wave length including a phosphor luminescent in the infra-red portion of the spectrum and being of sufficient thickness to absorb substantially all of the light liberated by a preceding layer.

HUMBOLDT W. LEVERENZ.

REFERENCES CITED

The following references are of record in the file of this patent:

UNITED STATES PATENTS

| Number | Name | Date |
| --- | --- | --- |
| 1,934,821 | Rudenberg | Nov. 14, 1933 |
| 2,030,403 | Ruttenauer | Feb. 11, 1936 |
| 2,096,986 | Von Ardenne | Oct. 26, 1937 |
| 2,124,225 | Batchelor | July 19, 1938 |
| 2,206,280 | Froelich | July 2, 1940 |
| 2,227,070 | De Boer | Dec. 31, 1940 |

FOREIGN PATENTS

| Number | Country | Date |
| --- | --- | --- |
| 474,907 | Great Britain | Nov. 9, 1937 |
| 490,029 | Great Britain | Aug. 4, 1938 |
| 498,740 | Great Britain | Jan. 10, 1939 |
| 514,776 | Great Britain | Nov. 17, 1939 |